United States Patent [19]
DiCiaccio et al.

[11] 3,791,037
[45] Feb. 12, 1974

[54] LINEAR ENCODER
[75] Inventors: James J. DiCiaccio, Somerville; John W. Gjertsen, Bedford; Alfred S. Nathanson, Brookline, all of Mass.
[73] Assignee: Itek Corporation, Lexington, Mass.
[22] Filed: Feb. 17, 1972
[21] Appl. No.: 227,138

[52] U.S. Cl............ 33/125 R, 33/138, 277/DIG. 4, 308/3.5
[51] Int. Cl......................... G01b 3/10, G01b 7/02
[58] Field of Search...... 33/125 R, 137 R, 138, 139, 33/140, 147 N; 74/566; 308/3.5; 277/169, DIG. 4, DIG. 7

[56] References Cited
UNITED STATES PATENTS
| | | | |
|---|---|---|---|
| 2,276,302 | 3/1942 | Guttmann | 33/125 R |
| 2,293,733 | 8/1942 | Guttmann | 33/125 R |
| 2,583,371 | 1/1952 | Guttman | 33/125 R |
| 1,426,296 | 8/1922 | Kerr | 74/566 |
| 3,271,564 | 9/1966 | Rosenfeld et al. | 33/138 |

Primary Examiner—Robert B. Hull
Assistant Examiner—Richard R. Stearns
Attorney, Agent, or Firm—Homer O. Blair; Robert L. Nathans; William C. Roch

[57] ABSTRACT

A linear encoder for precisely measuring distances along a measurement axis. One end of a flexible measuring tape is attached to an object, the movement of which is to be measured. The remainder of the measuring tape is wound in a helical configuration around a precise measuring cylinder. One central shaft supports the cylinder for rotational movement. The central shaft rotates with the measuring cylinder, and also supports for rotation a rotary encoder disc plate and a second cylinder which forms part of a constant torque spring motor. Movement of the measured object along the measurement axis results in the measuring tape being either drawn off or wound upon the measuring cylinder. This causes rotation of the measuring cylinder on the central shaft which in turn causes rotation of the encoder disc plate. A reading station adjacent to the encoder plate produces a digital output signal indicative of rotational movement of the encoder plate which is in turn indicative of movement of the measured object along the measurement axis. The constant torque spring motor maintains the measuring tape under constant tension.

6 Claims, 8 Drawing Figures

Patented Feb. 12, 1974

LINEAR ENCODER

BACKGROUND OF THE INVENTION

The present invention relates generally to the conversion of a linear movement into a signal representative of the movement, and more particularly pertains to a new and improved linear encoder for accurately converting a linear movement into a precise digital signal representative of the extent of the linear movement.

In general, a linear encoder is an instrument for measuring linear movement and providing an output signal indicative of the measured movement. Numerous types of linear encoders are currently available on the market. However, these instruments are not entirely satisfactory from the standpoint of versatility, temperature, stability and accuracy.

One approach to the construction of a linear encoder is illustrated in U. S. Pat. No. 2,276,302, issued to Guttmann. This patent illustrates a linear measuring system wherein a measuring tape is wound in a helical configuration around the periphery of a drum. The drum shaft is connected by speed reduction gearing to a constant torque electrical motor which in turn drives s clutch member and finally a dial type mechanical indicator. The instrument illustrated by Guttmann has a number of drawbacks which adversely affect the accuracy of the linear encoder. A number of driving and driven members, such as the stepdown gearing, the torque motor, and the clutch, are interposed between the measuring drum and the mechanical indicator. These numerous connections are a source of possible inaccuracy as each of them introduces possible errors between the initial measurement made by the drum and the indication output of the mechanical indicator. These errors may be introduced by slack, angular or shaft misalignment, or mechanical inaccuracies due to differing tolerances, and are significant when high accuracy is desired. Further, the instrument illustrated by Guttmann has the added disadvantage of not directly producing a usable electrical signal. Also, the Guttmann instrument is a rather complex and cumbersome assembly of many components which would be both difficult and expensive to construct. Further, the Guttman invention does not have a great deal of versatility in allowing itself to be adapted to many diverse situations as might occur in a number of different machine tools.

SUMMARY OF THE INVENTION

In accordance with an embodiment, a linear encoder is disclosed which is capable of very fine and accurate measurements over a large linear distance. The preferred embodiment illustrates a linear encoder which has a measuring tape wrapped around the periphery of a precise measuring cylinder. The measuring cylinder is mounted on a central shaft member which also drivingly supports a constant torque spring motor and an angular encoder measuring disc. An advantage of this unitary construction is that errors due to possible misalignment, slack, or differing mechanical tolerances are eliminated. The preferred embodiment is constructed to provide a linear encoder which is substantially unaffected by changes in ambient temperature. Also, the preferred embodiment provides an output signal in the form of a directly usable digital electrical signal. Further, the preferred embodiment utilizes a unique two-piece construction whereby one subassembly houses the measuring equipment including the measuring cylinder, the unitary shaft, the constant torque motor, the encoder disc and its reading station, and the second subassembly includes an elongated housing for enclosing, guiding, and protecting the measuring tape as the measuring tape is extended from the measuring subassembly. This modular construction technique has the advantage of allowing protective housings having different lengths to be fitted to the measuring subassembly in accordance with the requirements of a particular measuring situation.

Further, the preferred embodiment provides a novel means for coupling the linear encoder to the measured object. The novel coupling provides an accurate measurement of movement along the measurement axis regardless of slight rotational or translational movements of the measured object other than directly along the measurement axis. Also, the preferred embodiment provides a novel linear sealing means for sealing the linear encoder from the entrance of contamination, dirt and foreign particles through the aperture through which the coupling extends. This is an extremely useful feature as one of the common usages of a linear encoder is on machine tools where metal chips and other contaminents are commonly present and must be prevented from entering the linear encoder. The novel sealing means is inexpensive and easy to install, and eliminates a number of parts and also a number of costly and time consuming installation operations which were required by linear seals of the prior art.

DESCRIPTION OF A PREFERRED EMBODIMENT

Figure 1:
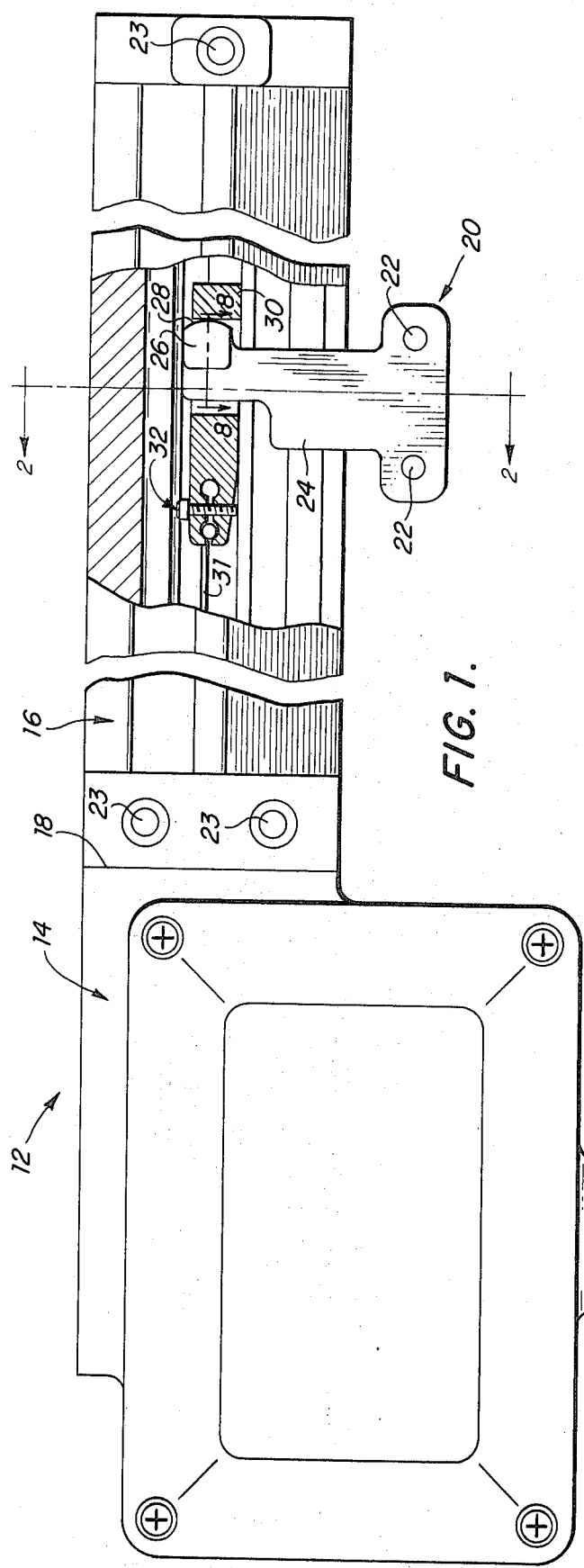
FIG. 1 is a partially sectioned side view of a preferred embodiment of the linear encoder.
Figure 2:
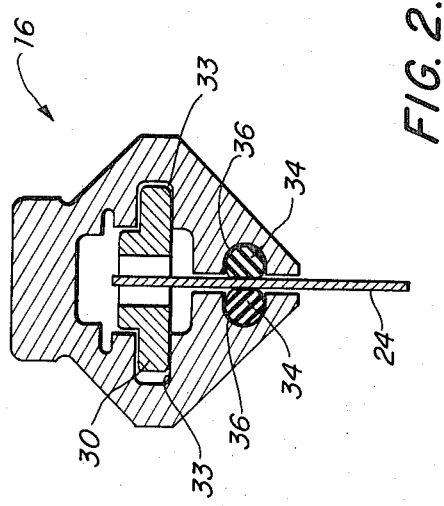
FIG. 2 is a sectional view of the coupling means for coupling the linear encoder to the measured object, and is taken along line 2—2 of FIG. 1.
Figure 8:
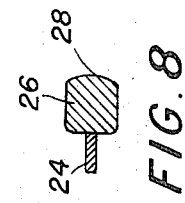
FIG. 8 is a sectioned view of the coupling element which couples the encoder to the measured object taken along line 8—8 of FIG. 1.

FIG. 1 is a partially sectioned side view of a preferred embodiment of the linear encoder. The linear encoder 12 includes a measuring subassembly 14 and a protective housing subassembly 16 which are joined together along line 18. A coupling 20 protrudes from the protective housing 16, and is normally attached to a measured body, such as a machine tool, by bolts through apertures 22. The linear encoder is normally attached to a reference body such as the machine frame by bolts extending through apertures 23. Reference should be made to both FIGS. 1 and 2 for a description of the coupler. FIG. 2 is a sectional view of the coupler taken along lines 2—2 of FIG. 1. The coupler 20 includes a first sheet metal section 24 and a second section 26. Section 26 is curved about two axes, as illustrated in FIGS. 1 and 8, to form a rounded nose 28 where it contacts a runner element 30. The rounded nose allows a solid contact with the runner element in spite of slight misalignments between the linear encoder and the measured body. Runner element 30 is attached at connection 32 to a measuring tape 31 extending from the measuring subassembly 14. The runner 30 is supported within grooves 33 of the protective housing 16 for translational movement along the measurement axis which runs parallel to the length of the protective housing.

FIG. 2 illustrates a novel linear sealing means 34 positioned on each side of the sheet metal coupling 24. The two linear seals 34 prevent the entrance of contamination, dirt and foreign particles into the protective housing subassembly 16. These two seals are positioned in two rounded grooves 36, and run the length of protective housing 16. In one embodiment, these seals were found to function satisfactorily when made from a solid sponge rubber. In alternative embodiments hollow rubber tubing might be used. The installation of these two seals is extremely easy, and involves merely stretching each seal along its length to reduce the diameter of the seal and then threading each seal along the length of the protective housing. After the stretched seal is in position the tension is released from the seal, and the seal expands into place in the protective housing. This novel linear sealing means eliminates a number of parts and also a number of costly and time consuming installation operations which were required by linear seals of the prior art. Linear seals as taught by the prior art would use two rectangular pieces of rubber which would be placed over the exterior sides of protective housing 16 such that they formed a V which converged on both sides of the sheet metal bracket 24. These seals had to be maintained in place by retainer strips along the length of each seal, and each retainer strip had to be secured to the housing by a number of screws along its length. Thus, a prior art linear seal involved two rectangular pieces of rubber, a retainer strip for each rubber piece, and a number of screws to secure each seal and retainer strip to the housing. The assembly involved drilling and tapping a number of holes along each side of the protective housing, tediously positioning all the members in their proper places, and finally screwing each of the numerous screws into place.

Figure 3:
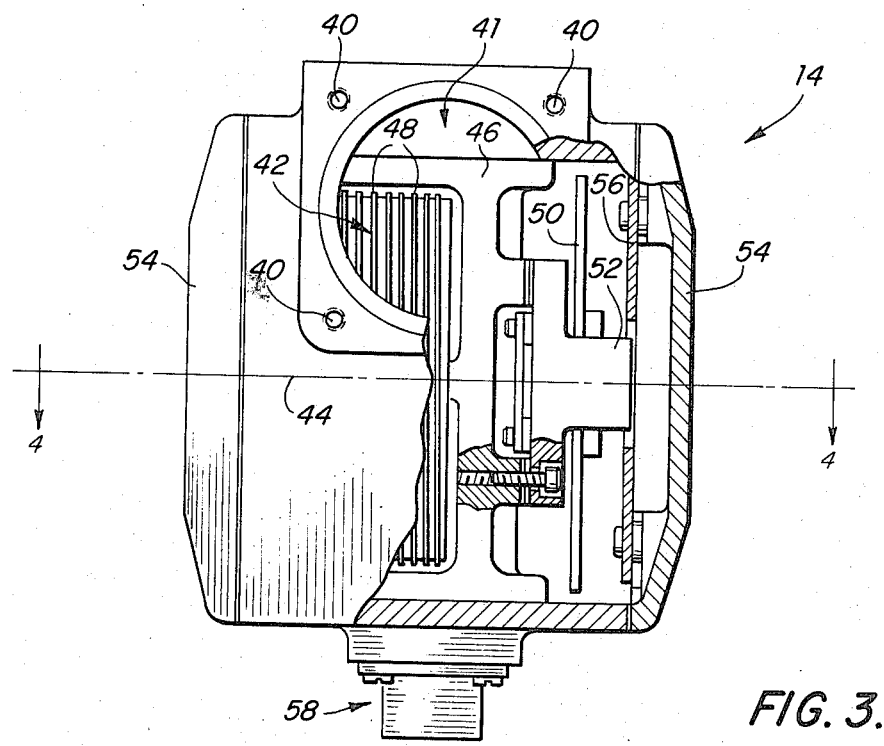
FIG. 3 is a partially sectioned view of the measuring subassembly of the linear encoder.

FIG. 3 is a partially sectioned view of the measuring subassembly of the linear encoder with the protective housing subassembly removed. The protective housing subassembly 16 is normally attached to the measuring subassembly 14 by means of four threaded holes 40 which are positioned around a circular aperture 41. A precision measuring cylinder 42 is supported within the measuring subassembly by a main support bracket 46 for rotation about an axis 44. The precision measuring cylinder 42 has a guide 48 wrapped in a helical fashion about its outside diameter. The guide 48 serves to correctly position measuring tape 31 in a helical configuration around the periphery of measuring cylinder 42. The measuring tape, not shown in FIG. 3, is wrapped tightly around the measuring cylinder and between the helical guide. In the preferred embodiment, the measuring tape has a rectangular cross sectional shape, is made of a low thermal expansion nickel alloy such as a material sold under the trademark Invar by the Carpenter Steel Company. In the preferred embodiment the measuring tape is wrapped around the measuring cylinder thirteen times. In alternative embodiments the measuring tape might be constructed of different materials, have a different number of turns around the measuring drum, and have a different cross sectional shape, such as circular. The measuring tape normally extends through aperture 41 and into the protective housing subassembly 16 for connection at point 32 along the measuring axis.

FIG. 3 also illustrates an encoding member 50 which is supported for rotational movement with measuring cylinder 42. In the preferred embodiment, the encoding member is an incremental encoder disc, and is designed to generate 8,000 pulses per revolution. In an alternative embodiment the encoder disc plate might be an absolute type with several tracks, and the accuracy of the fine track might be different than 8,000 pulses per revolution. A C shaped reading station 52 is positioned around the outside edge of encoder disc 50, and provides a reading of relative movement between the reading station and the encoder disc. The C shaped reading station may be constructed in accordance with known techniques in the encoder arts, or more particularly may be constructed in accordance with the teachings of Patent Application 227,061, filed Feb. 17, 1972, by James Obbard entitled Encoder Reading Station. The C shaped reading station is designed to illuminate the track or tracks from one side of the encoder disc plate, and detect radiation modulated by the track or tracks on the other side of the encoder disc plate. In the preferred embodiment the encoder disc plate is an incremental encoder disc, and only one track is present along the periphery of the encoder. The C shaped reading station is attached to the main frame 46 by two screws positioned at each end of the reading station, one of which is illustrated. The reading station protrudes into an aperture in a printed circuit board 56 where connections are made between the printed circuit board and the reading station. Two outside covers 54 are positioned on both sides of the main frame of the measuring subassembly 14. One cover 54 supports printed circuit 56 which contains most of the circuitry required for the inside of the measuring subassembly 14. The circuits on printed circuit board 56 are constructed in accordance with art known and recognized techniques.

FIG. 3 also illustrates an electrical connector 58 which supplies all electrical power to the encoder and transmits all output signals from the encoder. In the preferred embodiment, the connections from the electrical connector 58 proceed by three groups of ribbon wire to three separate electrical connections. The first ribbon wire is connected to the light beam producing section of the reading section, which in the preferred embodiment consists of laser emitter diodes. This electrical connection merely supplies power to these light sources. The second ribbon wire is connected to the photodetector of the reading station, which in the preferred embodiment consists of phototransistors. The third ribbon wire is connected to the printed circuit board wherein other necessary electrical connections in the encoder are made.

Figure 4:
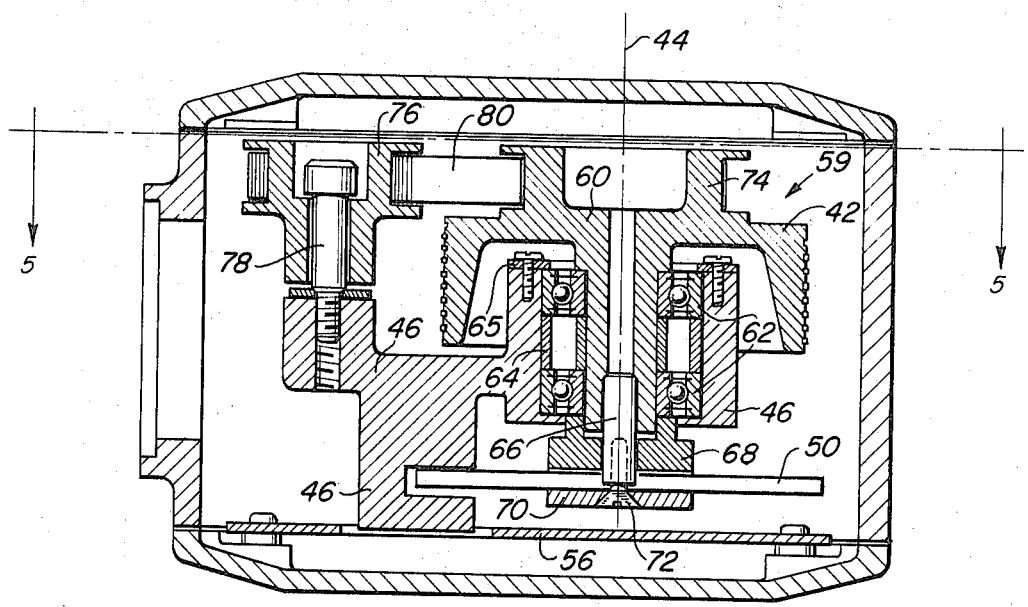
FIG. 4 is a sectioned view of the measuring subassembly of the linear encoder, and is taken along line 4—4 of FIG. 3.

FIG. 4 is a sectioned view of the measuring subassembly of the linear encoder, and is taken along line 4—4 of FIG. 3. As shown, the precision measuring cylinder 42 is part of one integral rotating assembly 59 which includes a central shaft 60 and a second cylinder 74, which forms part of a constant torque motor. This integral assembly is preferably made of a low thermal expansion nickel alloy such as Invar material. The rotating assembly 59 is supported for rotation by a pair of bearings 62 mounted in housing 46 as follows. A circular retainer washer 65 is mounted at one end of the housing 46. The bearings 62 are spaced apart within the housing by a spacer element 64. The shaft 60 is tapped at one end so that a stud 66 may be screwed into the center of the tapped shaft. A disc table element 68 is mounted on the shaft and adjacent to bearing element 62. The encoder disc 50 is mounted adjacent to disc table element 68, and is secured thereto by a retainer washer 70 and a screw 72 which screws into stud 66. The preload pressure on bearings 62 is determined by the torque used to tighten screw 72.

Figure 5:
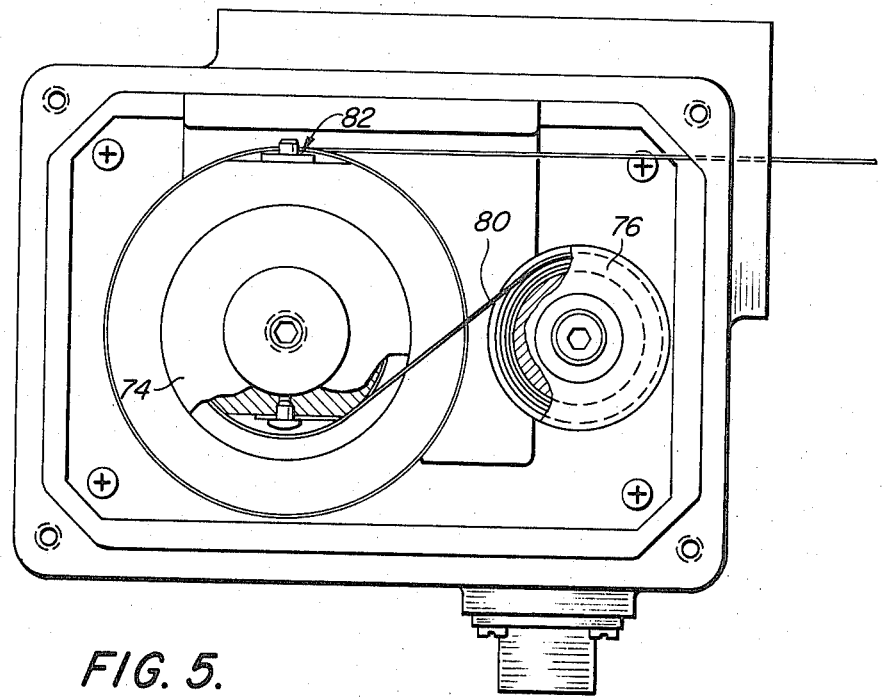
FIG. 5 is a view of the constant torque spring motor of the measuring subassembly, and is taken along line 5—5 of FIG. 4.

FIGS. 4 and 5 illustrate the constant torque motor used to maintain the measuring tape under constant tension. Second cylinder 74 is formed as an integral part of rotating assembly 59. As shown, a pick-up cylinder 76 is mounted adjacent to second cylinder 74. Shaft element 78 which bolts onto housing 46, mounts the pick-up cylinder 76 for rotation relative to frame member 46. A spring element 80 is wound on both cylinders 74 and 76, and these three parts form a constant torque motor to maintain the measuring tape under constant tension. The spring may be of the type sold under the trademark NEGATOR by Hunter Spring Company, of Hatfield Pennsylvania. A Negator spring is a prestressed flat spring coil element, and is wound around the second cylinder 74 in a direction opposite to the stressed condition of the spring. As the measuring tape is drawn off measurement cylinder 42, the second cylinder 74 is rotated, and the spring 80 is progressively transferred from the pick-up cylinder 76 to the second cylinder 74. As this action occurs the spring element 80 is first pulled straight along a line tangent to the pick-up cylinder 76 and the second cylinder 74, and is then wrapped backwards counter to its relaxed curvature around the second cylinder 74. During rotation of the second cylinder 74, that portion of the spring element already transferred to the second cylinder does not change its stress value and the material remaining on the take-up cylinder is vertually zero stressed. Only the section of the spring element passing through the straight line zone and undergoing a change in stress exerts a torque upon the second cylinder 74. Thus the entire length of material during winding or unwinding is stressed incrementally in a noncumulative fashion. The torque produced by this motor is perfectly constant from start to completion of the complete driving cycle. In alternative embodiments the Negator spring type of constant torque motor might be replaced by a magnetic torque motor of a viscous coupling motor driven at a constant speed.

FIG. 5 also illustrates the attachment 82 which securely fastens the end of the measuring tape to the precision measuring drum. This attachment is necessary as any slippage between the measuring tape and the precision measuring cylinder would result in erroneous output signals from the linear encoder.

It is desirable to provide a linear encoder which is extremely accurate and substantially unaffected by changes in ambient temperature. To achieve this goal it is necessary that the precision measuring cylinder 42 be made from a material having a very low coefficient to thermal expansion such as quartz or Invar material. Further, the cylinder should be precision ground to a very fine tolerance, preferably to within a few millionths of an inch. Any eccentricities or variations in the diameter of the precision cylinder adversely affect the accuracy of the linear encoder. When determining the desired diameter of the measuring cylinder, it should be realized that the actual diameter of the linear encoder which is important to the operation of the instrument is that defined by the middle of the measuring tape and not that defined by just the measuring cylinder.

In the preferred embodiment, a catenary curve is developed by the measuring tape as the measuring tape is withdrawn off the measuring cylinder. This curve develops as the measuring tape is not supported along its length as it extends into the protective housing subassembly. In the preferred embodiment this catenary curve is taken into account while computing the desired diameter of the measuring drum, and the diameter is designed slightly larger to compensate for the catenary curve. The catenary curve results in a length of measuring tape being withdrawn from the measuring drum which is slightly longer than the distance travelled by the measured object. If the measuring drum is constructed with a slightly larger diameter, the longer length of measuring tape which is withdrawn because of the catenary curve will cause the measuring cylinder to rotate a slightly less amount, and accordingly the system can be disigned to compensate for the catenary curve. In alternative embodiments a support directly beneath the measuring tape might be utilized to prevent a catenary curve.

Figure 6:
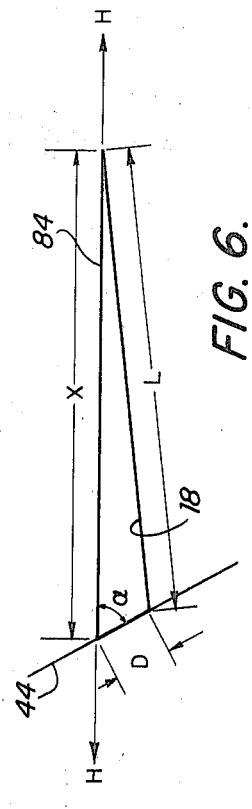
FIG. 6 is a diagram used for explanatory purposes.

Even though the precision measuring cylinder is ground to a very precise tolerance, after the encoder is assembled and tested there may exist slight errors in the output signals of the linear encoder. For instance, the linear encoder may either overmeasure or undermeasure a precise linear distance. This error may be corrected by a scale factor adjustment which involves angularly shifting the measuring cylinder axis 44 to a slight extent with respect to the measurement axis. Reference should be made to FIG. 6 for an explanation of this adjustment. The axis of rotation 44 of the measuring cylinder is shown tilted with respect to a normal angle relative to the measurement axis 84. The angle is exaggerated for purposes of illustration. In FIG. 6, L equals the length of the measuring tape, X equals the straight line distance being measured, D equals the angular shift of the measuring tape along the measuring cylinder as the tape is withdrawn off the cylinder, R equals the ratio of the axial pitch of the measuring tape to the cylinder circumference, and $\alpha$ is the angle between the cylinder axis and the measuring axis. The angle $\alpha$ may normally deviate from a right angle by typically from 1° to 3°. The following equations apply to this geometrical setup:

1 $L^2 = X^2 + D^2 - 2XD \cos \alpha$
2 $D = RL$
3 $L^2 = X^2 - 2XRL \cos \alpha + R^2 L^2$
4 solution of quadratic gives $X/L = R \cos\alpha \pm \sqrt{1 - R^2 \sin^2 \alpha}$
5 or approximation, $X/L = 1 + R \cos \alpha - R^2/2 \sin^2 \alpha$ These equations demonstrate that by adjusting $\alpha$, the scale factor between X and L is also adjusted.

Figure 7:
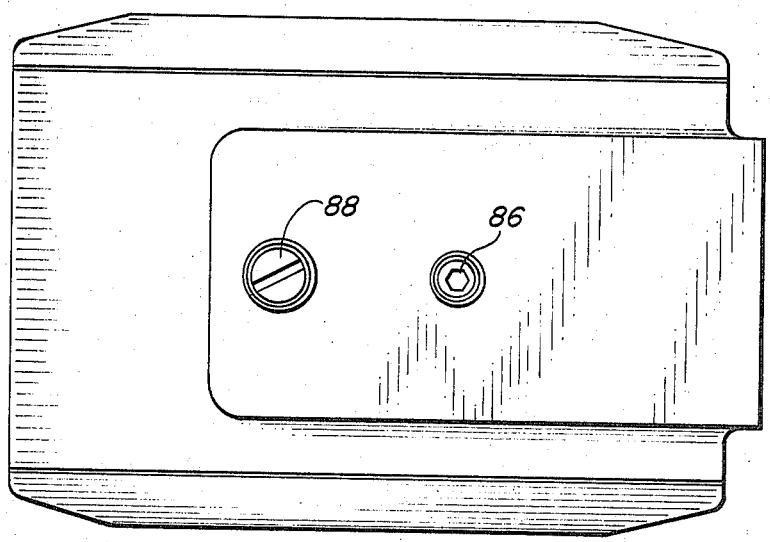
FIG. 7 is a top view of the measuring subassembly of the linear encoder.

FIG. 7 is a top view of the measuring subassembly of the linear encoder, and illustrates how the exact angle α between the axis of the measuring cylinder and the measuring axis may be adjusted. FIG. 7 illustrates two screws 86 and 88 which secure the main support bracket 46 to the exterior frame of the linear encoder. Support member 46 pivots generally about screw 88, and the aperture in the housing surrounding screw 86 is sufficiently large to enable the angle of the support bracket to be changed. After a correct angle is selected, each of these screws is tightened down which secures the angular position of the measuring drum in the linear encoder.

During operation of the linear encoder, the bracket 20 would be securely attached to an object, such as a machine tool, the movement of which is being measured. The linear encoder is normally attached to a reference body such as the machine frame by bolts extending through apertures 23. As the machine tool moves relative to the machine frame and along the measurement axis, measuring tape is either drawn off or wound upon the measuring cylinder. This causes rotation of the integral rotating assembly 59 including the encoder disc plate. Relative movement between the encoder disc plate and the reading station causes the reading station to generate electrical digital signals which are indicative of movement of the machine tool. During this operation, the constant torque motor maintains the measuring tape under constant tension to ensure that no slack exists in the measuring tape.

While several embodiments have been described, the teachings of this invention will suggest many other embodiments to those skilled in the art.

We claim:

1. Linear encoder apparatus for measuring a distance along a measuring axis and comprising:
   a. a support body;
   b. a central shaft mounted on said support body for rotation about a rotational axis approximately orthogonal to said measuring axis;
   c. a measuring cylinder mounted on said central shaft for rotation therewith;
   d. a measuring tape wrapped in a helical configuration around the periphery of said measuring cylinder;
   e. an encoding member mounted on said central shaft for rotation therewith;
   f. a reading station mounted adjacent to said encoding member for reading out relative movement between said encoding member and said reading station, and for producing a signal representative of that movement;
   g. torque means for exerting a torque on said central shaft to maintain said measuring tape under tension as said measuring tape is drawn off or wound upon said measuring cylinder;
   h. a protective housing assembly extending along said measuring axis for protecting said measuring tape against contamination from dirt and other particles as said measuring tape is drawn off said measuring cylinder;
   i. a slider element mounted for linear movement along the length of and inside said protective housing assembly, said slider element being attached to one end of said measuring tape;
   j. said protective housing assembly including a slot located along its length for providing for coupling between said slider element and the measured object;
   k. a coupling means extending from said slider element through said slot for attachment to the measured object such that linear movement of the measured object causes a corresponding linear movement of said slider element; and
   l. said protective housing assembly including a linear sealing means along said slot for preventing the entrance of contaminants or dirt into the protective housing assembly, said linear sealing means including two grooves in said protective housing assembly with one groove running along each side of said slot, and further including a long resilient pliable seal inserted into each groove and running along the length of said protective housing, each long pliable seal initially having a cross sectional area larger than that of the corresponding groove, each seal being inserted into each groove by stretching the seal to reduce the cross sectional area of the seal until it is smaller than that of the groove, introducing the stretched seal along the length of the groove, and then allowing the seal to retract in place in the groove in the protective housing assembly to be frictionally held by said groove.

2. Apparatus as set forth in claim 1 wherein:
   a. said linear encoder is constructed in a modular manner with two major assemblies as components, a measuring assembly and said protective housing assembly; and
   b. said measuring assembly includes an external housing which functions as said support body and which houses said central shaft, said measuring cylinder with said measuring tape wrapped around said measuring cylinder, said encoder disc plate, said reading station and said torque means, whereby the modular construction allows protective housing assemblies of different lengths to be fitted to said measuring assembly depending upon the particular requirements of a measuring situation.

3. Apparatus as set forth in claim 2 wherein:
   a. said central shaft is mounted for rotation in said external housing by a support bracket;
   b. a mounting means mounts said support bracket to said external housing; and
   c. said mounting means includes means for allowing slight rotations of said support bracket relative to said external housing about an axis substantially orthogonal to said measuring axis and the axis of said shaft such that said central shaft may be rotated relative to said measuring axis, whereby the scale factor of said linear encoder may be conveniently adjusted.

4. Apparatus as set forth in claim 3 wherein said mounting means includes first and second screw members extending through said external housing and into said support bracket, said first screw member allowing said support bracket to be pivoted slightly about it, and said second screw member acting as a locking member for locking a particular angular position of said support bracket relative to said external housing, whereby the assembled linear encoder may be tested, the angular position of said support bracket adjusted to attain the proper scale factor, and then said first and second screws may be tightened to secure the adjusted angular position of said support bracket.

5. Apparatus as set forth in claim 1 wherein:
a. said torque means includes a second cylinder mounted directly upon said central shaft for rotation therewith;
b. a pick-up cylinder mounted on said support body to rotate about an axis substantially parallel to the axis of said shaft and being adjacent to said second cylinder; and
c. a prestressed spring element extending between said second cylinder and said pick-up cylinder and being oppositely wound on said pickup and second cylinders in a manner to exert a constant torque upon said central shaft and thereby maintain said measuring tape under constant tension.

6. Apparatus as set forth in claim 1 wherein said central shaft, said measuring cylinder and said second cylinder are formed of one unitary molded piece of material.

* * * * *